No. 835,371. PATENTED NOV. 6, 1906.
E. H. SMITH.
CLOD CRUSHER AND PULVERIZER.
APPLICATION FILED FEB. 20, 1906.

WITNESSES:
Geo. Ackman Jr.
F. A. Elmore

INVENTOR
Elmer H. Smith
BY Victor J. Evans
Attorney

UNITED STATES PATENT OFFICE.

ELMER H. SMITH, OF BIRDS, ILLINOIS.

CLOD CRUSHER AND PULVERIZER.

No. 835,371.   Specification of Letters Patent.   Patented Nov. 6, 1906.

Application filed February 20, 1906. Serial No. 302,067.

*To all whom it may concern:*

Be it known that I, ELMER H. SMITH, a citizen of the United States, residing at Birds, in the county of Lawrence and State of Illinois, have invented new and useful Improvements in Clod Crushers and Pulverizers, of which the following is a specification.

This invention relates to clod crushers and pulverizers adapted for use upon wheeled plows, and has for its objects to produce a comparatively simple inexpensive device of this character which may be conveniently attached to the plow, one in the use of which the operations of plowing and harrowing the soil will be simultaneously performed, and one wherein the crushing or harrowing roller may be conveniently raised when circumstances require.

With these and other objects in view the invention comprises the novel features of construction and combination of parts more fully hereinafter described.

Figure 1:
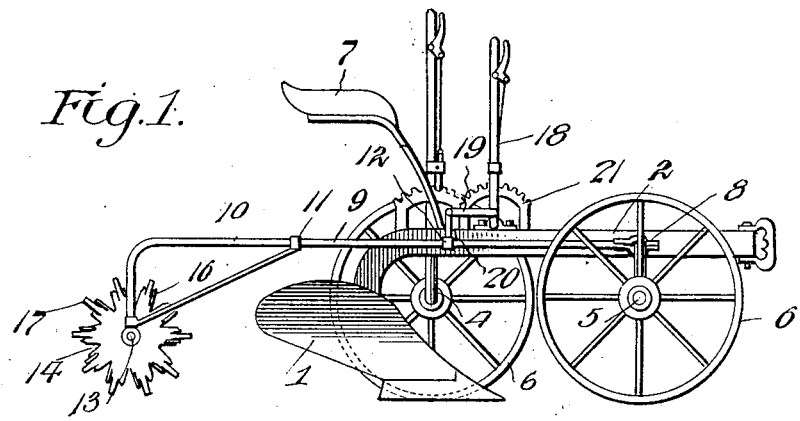
Figure 2:
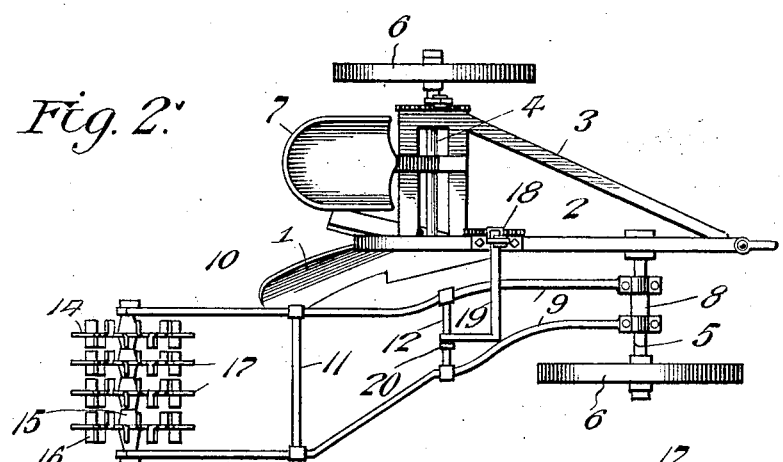
Figure 3:
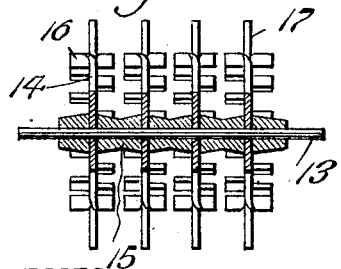
Figure 4:
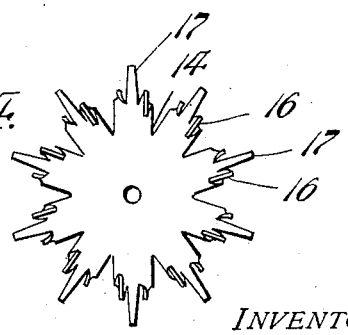

In the accompanying drawings, Figure 1 is a side elevation of a wheeled plow equipped with a harrowing device embodying the invention. Fig. 2 is a top plan view of the same. Fig. 3 is a detail side elevation, partly in section, of the crushing-roller. Fig. 4 is a face view of one of the harrowing members or disks.

Referring to the drawings, 1 designates the plow, 2 its beam connected in a frame 3, provided with axles 4 5, equipped with transporting-wheels 6, there being sustained upon the frame a seat 7, these parts, except as hereinafter explained, being of the usual construction and arrangement and adapted in practice to perform their ordinary functions.

Journaled at their forward ends upon the crank portion 8 of the front axle 5, which projects outwardly at the furrow side of the frame, is a pair of frame bars or members 9, included in the frame 10 of the harrow and connected at appropriate intervals between their ends by transverse frame-bars 11 12, there being journaled in the rear ends of the frame members 9 a shaft 13, adapted to receive a plurality of harrowing members or disks 14, preferably composed of sheet metal and maintained in appropriately-spaced relation by tubular spacing members or blocks 15 and provided with transversely-projecting cutting members or blades 16, struck from the material of the disks 14, upon which there are also formed radially-projecting teeth 17, it being noted in this connection that the blades 16 after being struck from the disks are bent to dispose their side faces on lines radially of the disks.

Journaled at its lower end to the beam 2 is an operating-lever 18, having a horizontal L-shaped crank-arm 19, connected by a link 20 with the forward cross-bar 12, while sustained upon the same part is a ratchet 21, adapted for engagement by a pawl on the lever 18 to lock the latter against movement.

In practice, as the machine advances over the ground and the soil is turned by the plow 1 the harrowing-disks 14 will act upon the newly-turned moist soil for crushing and disintegrating the clods, thus effectually breaking and pulverizing the soil and rendering its condition proper for planting. When it is desired to turn the machine at the end of a row or to move the same from one field to another, the harrowing-roller may be raised clear of the ground through the medium of the lever 18, which acts through the medium of crank-arm 19 and link 20 for raising the frame 10. It will be observed that the harrowing-roller is disposed at the furrow side of and to travel in rear of the plow, whereby the soil will immediately after being turned be harrowed, thus providing for the performance of the plowing and harrowing operations in a single action of the machine, and, further, that the harrowing-roller will, due to the blades being turned radially thereof, effectually cut the clods.

Having thus described my invention, what I claim is—

A harrowing-roller comprising a shaft and a plurality of disks mounted thereon in spaced relation, the disks being composed of sheet metal and having radiating teeth provided at their outer ends each with a pair of integral, transversely-extending cutting-blades having their side faces disposed in the plane of lines drawn radially of the disks.

In testimony whereof I affix my signature in presence of two witnesses.

ELMER H. SMITH.

Witnesses:
W. O. PINKSTAFF,
W. H. PHILLIPPS.